US006714305B2

(12) United States Patent
Hoke

(10) Patent No.: US 6,714,305 B2
(45) Date of Patent: Mar. 30, 2004

(54) TUNABLE FABRY-PEROT CAVITY FILTER AND METHOD FOR MAKING AND USING THE FILTER

(75) Inventor: Charles D. Hoke, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 129 days.

(21) Appl. No.: 09/916,920

(22) Filed: Jul. 26, 2001

(65) Prior Publication Data

US 2003/0020865 A1 Jan. 30, 2003

(51) Int. Cl.[7] .............................. G01J 3/45; G01B 9/02; B02F 1/1333
(52) U.S. Cl. .............................. 356/454; 349/89; 349/91
(58) Field of Search ........................... 349/84, 86–91; 356/454

(56) References Cited

U.S. PATENT DOCUMENTS 5,068,749 A    11/1991    Patel .............................. 359/93

OTHER PUBLICATIONS

M.W. Maeda, et al., "Electronically Tunable Liquid–Crystal–Etalon Filter for High–Density WDM Systems," IEEE Photonics Tech. Ltrs. vol 2, No. 11 (Nov. 1990).
E.G.J. Wijnhoven et al., "Preparation of Photonic Crystals Made of Air Spheres in Titania," Science, vol. 281 (Aug. 7, 1998).
R. Blacker, et al., "Nano–Phase Polymer Dispersed Liquid Crystal," DERA (UK) (1998).

*Primary Examiner*—John F. Niebling
*Assistant Examiner*—Viktor Simkovic

(57) ABSTRACT

A tunable Fabry-Perot filter, which includes a pair of opposed partially reflective surfaces, a cavity between the partially reflective surfaces, a nano-dispersion of liquid crystals disposed in the cavity, and a control unit for applying an electric field to the liquid crystals.

21 Claims, 1 Drawing Sheet

TUNABLE FABRY-PEROT CAVITY FILTER AND METHOD FOR MAKING AND USING THE FILTER

BACKGROUND

1. Field of the Invention

The present invention relates generally to optical filters and pertains particularly to tunable Fabry-Perot etalon cavity filters utilizing liquid crystals.

2. Background of the Invention

Optical filters have a wide variety of applications, particularly in optical communications networks. Such filters are useful for separation of certain signals from within bands of signals.

Fiber optic networks have come into wide use for both voice and data telecommunications in recent years. Filters are widely used in these networks to separate certain signals from the bands of signals. One of the simplest filters used in such networks is the tunable Fabry-Perot filter. The Fabry-Perot filter consists of a cavity bound on each end by a partially silvered mirror.

In general, existing solutions for telecommunications applications typically have one of two drawbacks. They either: 1) require moving parts, which is undesirable; or 2) are solid state with polarization dependence and a small tuning range.

The Fabry-Perot filter can be tuned by moving one of the mirrors. One of the primary techniques of the past has been to attach one of the mirrors to a piezoelectric crystal and change the voltage across the crystal to tune the filter. The crystal can be controlled to the point that one can get accuracy of movement of less than the diameter of an atom. That is quite satisfactory for some applications but far too slow for proposed applications such as optical packet switching.

Another approach to tuning such filters is to change the refractive index (RI) of the material inside the cavity of the filter. This can be accomplished by filling the gap or cavity with a liquid crystal material. The RI of the liquid crystal material can be changed very quickly by applying a voltage across it. Tuning times for this type filter are reported by be around ten msec but in theory sub-microsecond times should be attainable. One problem with filters of this type is that they are polarization sensitive. Another problem is that they have a very narrow or small tunable range.

Some early approaches used well ordered nematic and smectic liquid crystals that possessed a well defined optic axis on a macroscopic scale (greater than the wavelength of light). Such a device exhibits many desirable characteristics, namely, broad tuning range, low voltages, and low loss. However, these devices are intrinsically sensitive to the polarization of the incident light.

U.S. Pat. No. 5,068,749 discloses an approach which overcomes some of the polarization problems by the imposition initially of a particular orientation on the molecules of the liquid crystal material. This approach, however, has a number of drawbacks, including a very thin/narrow tunable range.

More recently, attempts employing a tunable cavity based on a polymer dispersed liquid crystal (PDLC) to overcome the polarization problem have been made. A PDLC consists of a sponge-like polymer layer whose voids are filled with liquid crystal. The PDLC element is created by an ultraviolet-light-driven polymerization process, which is a chemical reaction. Even if the process starts with 50% liquid crystal, after polymerization it is likely that only about 10% of the liquid crystal will be in a switchable droplet form when the process is completed. In other words, the PDLC does not provide a precisely controllable volume fraction of liquid crystal in the final product. The shortcomings of this system result from the fact that the droplets typically form by phase separation of the polymer and liquid crystal. The droplet size can be controlled to some extent by controlling the polymerization kinetics. However, droplet size is inversely proportional to the volume fraction of the material that phase separates out of the polymer and liquid crystal mixture. This process does not facilitate precise control of droplet size so polarization independence is not complete. Therefore, these PDLC devices generally have a small effective index modulation depth or range, typically about 5–10 nm, and are subject to large attenuation of the optical signals by the organic matrix in which the liquid crystal is embedded. The attenuation results from the fact that the polymer in the PDLC absorbs in the infrared.

Therefore there is a need for a tunable filter that overcomes the above problems of the prior art. More specifically there is a need for a filter that is polarization insensitive, has minimal attenuation, and is electronically tunable over a usefully wide range.

SUMMARY OF THE INVENTION

It is a primary purpose of the present invention to overcome the above problems of the prior art, creating a tunable Fabry-Perot filter having low cost, a broad tuning range, low voltage and low loss.

In accordance with this purpose, the tunable Fabry-Perot etalon filter employed in this invention comprises a pair of opposed, at least partially reflective, generally parallel surfaces positioned to form a cavity therebetween, and a controlled nano-dispersion of liquid crystals disposed in a matrix in the cavity. Means for applying an electric field to the liquid crystals can be added to make the filter controllable as to the optical wavelengths it will pass.

Employing a matrix formed by using precisely controlled spherical shapes that are driven off as the matrix material is fused enables the matrix to include small, irregularly positioned liquid crystal droplets. This results in polarization independence. Since the matrix structure is formed in a controlled manner, a structure with about 50% to about 68% liquid crystal by volume is achievable. This relatively large fraction of liquid crystal droplets in the matrix, which are switchable, facilitates a tuning range of about 30 nm. By using a metal oxide for the matrix in which the liquid crystal droplets reside, the attenuation factor is minimized because metal oxides are transparent to the infrared.

The metal-oxide matrix, formed according to the invention, creates a template of holes which are filled with liquid crystal droplets.

BRIEF DESCRIPTION OF THE DRAWING

The objects, advantages and features of the present invention will become more apparent to those skilled in the art from the following detailed description, when read in conjunction with the accompanying drawing, wherein.

DETAILED DESCRIPTION OF THE PREFERRED EMBODIMENTS

The present invention provides a tunable Fabry-Perot (FP) etalon filter wherein a pair of opposed, at least partially reflective surfaces are positioned to form a cavity or space between them. A nano-dispersion of liquid crystals is disposed in a metal-oxide matrix in the cavity, and means are provided for applying an electric field to the liquid crystals. This invention provides a filter that is polarization insensitive and electronically tunable over a relatively wide refractive index range.

Figure 1:
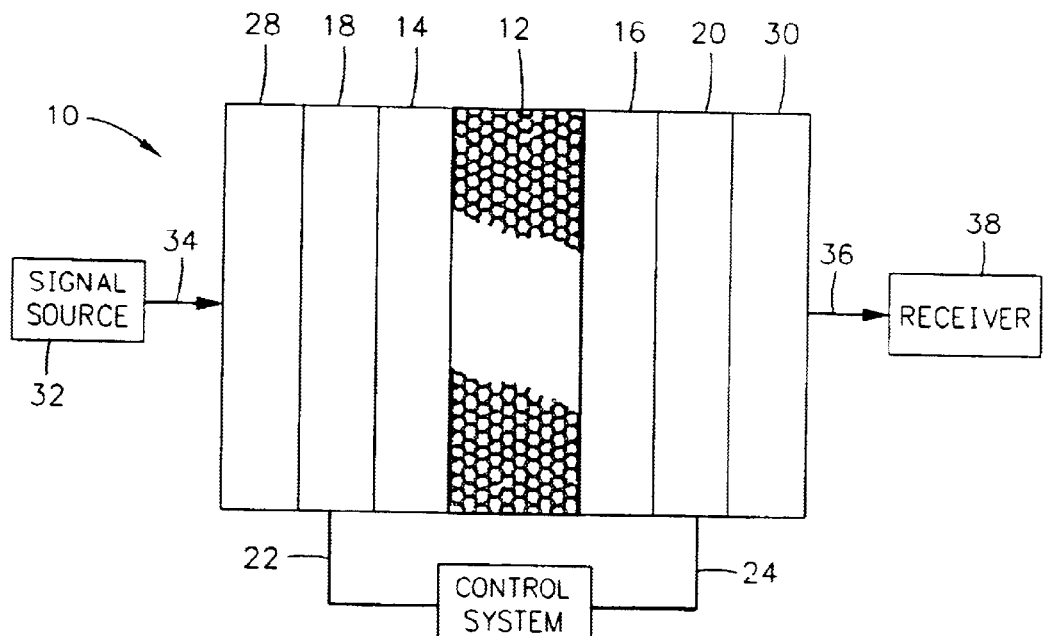
FIG. 1 is a diagrammatic illustration of an optical filter made in accordance with the present invention.

Referring to FIG. 1, there is diagrammatically illustrated an optical filter constructed in accordance with one embodiment of the present invention. This optical filter, designated generally by reference numeral 10, comprises a pair of spaced apart, generally parallel, at least partially reflective surfaces or mirrors 14 and 16, with a cavity or space defined between the two reflective surfaces. Disposed within the space between the two mirrors is a matrix 12 incorporating a nano-dispersion of liquid crystals. This nano-dispersion of liquid crystals is disposed in an irregularly arranged array of holes in a metal-oxide matrix or template. The metal-oxide matrix is preferably formed from titanium dioxide ($TiO_2$), but may also be formed from silicon dioxide ($SiO_2$) or zirconium dioxide ($ZrO_2$). Further alternatives for the template structure are other metal oxides, or silicon or germanium. The liquid crystals are formed or contained in an array of generally spherical cavities formed in the metal-oxide structure. These spheres or droplets of liquid crystal are preferably between about 10 and 50 nanometers in diameter and make up between about 50 and 68% of the volume of the matrix. The matrix has a thickness between mirrors 14 and 16 of about 5–10 $\mu$m, although that dimension is not critical in most instances. The mirrors typically have a reflectivity as high as possible, but practicality prevents 100% reflectivity. There may be instances where a less sharp filter is desired, and the reflectivity could be as low as about 50%, depending on the desired filter shape.

Disposed on either side of the mirrors are optically transparent electrodes 18 and 20 connected by electrical leads 22 and 24 to control system 26. The control system includes an electrical power source for applying electrical current or voltage to the electrodes. The electrodes may be made of any suitable transparent material such as, for example, layers of indium tin oxide. The above-described structure is contained between a pair of transparent support structures such as glass plates 28, 30, or the like. This structure provides a Fabry-Perot etalon filter that is polarization insensitive and electronically tunable over a wide refractive index range. The range of optical wavelengths over which the FP filter is tunable is determined by the thickness of the cavity between mirrors 14 and 16.

Optical signal source 32 produces a band of signals 34 that are transmitted, such as by optical fibers, to filter 10. Optical signal source 32 may be any suitable source such as a light emitting diode, laser or other source. The band of signals pass into the filter and signals of a certain frequency are passed through the filter and transmitted to receiver 38. Control system 26 provides and directs electrical voltage to electrodes 18 and 20 to control the RI of liquid crystals 12 and thereby tune the filter over a predetermined range of frequencies.

In operation, optical signal source 32 generates and transmits optical signals 34 which passes into the filter. A portion of this signal, having a frequency determined by the RI of the liquid crystals, emerges from the filter as signal 36, which is transmitted to receiver 38. The filter is electronically tunable by changing the electro-optical properties of liquid crystal structure 12 contained between mirrors 14 and 16. The electro-optical properties of the liquid crystal material are altered by the controllable electrical field or voltage generated and transmitted by control system 26 via leads 22 and 24 to electrodes 18 and 20.

The liquid crystals in matrix 12 are not polarized and thus operation of the filter over its tuning range is independent of the polarization of the input signal. This means that the wavelength selected by control system 26 from signal 34 will be delivered to receiver 38 with substantially the same intensity regardless of the polarization of the input signals. This construction provides a device that has a much wider range of tunability than the PDLC type of liquid crystal structure because of the large volume fraction of modulated liquid crystal, about 50–68%, as previously stated.

The specified construction provides isolated little "spheres" of liquid crystal droplets that are fairly uniformly dispersed throughout the structure. The droplets are smaller than the wavelength of light for which it is designed. With this construction it is possible to get well in excess of 50% liquid crystal in the overall liquid crystal matrix structure. If the spheres are all of a single substantially uniform size the liquid crystal content could be up to about 68% of the structure. Such a structure gives about seven times more tunable range that the prior PDLC type structures. The titanium-dioxide structure within the matrix is safe to use with invisible light, infrared and visible light.

Figure 2:
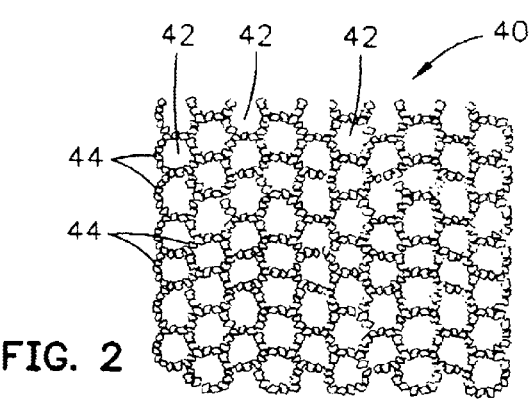
FIG. 2 is a generally enlarged diagrammatic illustration of a portion of a metal-oxide matrix for the liquid crystal dispersion in accordance with the invention.

The method of the making the liquid crystal unit or matrix in accordance with one embodiment of the invention utilizes a procedure that is similar to that used in creating synthetic inverse opals from colloid crystals. The resulting support or matrix structure as illustrated in FIG. 2 is an array of holes in a metal-oxide matrix. The ratio of holes to the surrounding matrix material is important in obtaining the maximum switchable volume of liquid crystal. Since the holes were templated by the colloid crystals, the volume fraction of liquid crystal is determined only by the packing fraction of the beads used to form the colloid crystal template. The switchable volume fraction of the liquid crystal by this method is likely to be a factor of about three larger than PDLC based FP cavities. This enables the relatively wide tuning range for the filter. Moreover, many metal oxides are transparent to infared light, which makes them ideal candidates for a low loss matrix.

Referring to FIG. 2, there is illustrated partial matrix structure 40 comprised of an array of holes 42 in metal-oxide matrix 44 made in accordance with the procedures for making the liquid crystal of the present invention. This structure is formed such as by a method described for the creation of photonic crystals made of air spheres in titania. This process is described in an article entitled *Preparation of Photonic Crystals Made of Air Spheres in Titania* by Wijnhoven and Vos, Science, Vol. 281, pages 802–804 (Aug. 7, 1998). The term "array" should not be taken to infer that holes 42 in structure 40 are in any way regular, but the array of holes is, in general, an irregular array of randomly positioned holes.

Figure 3:
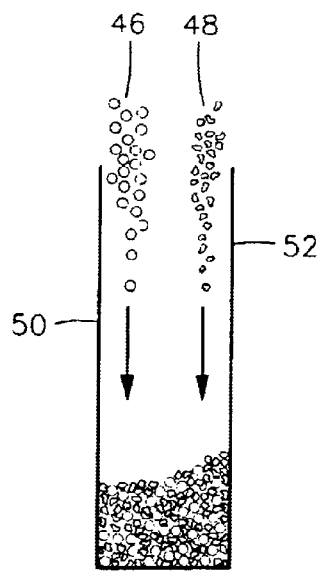
FIG. 3 is a diagrammatic illustration of a step in making the liquid crystal structure for the optical filter of FIG. 1.
Figure 4:
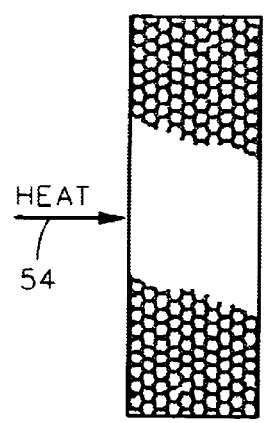
FIG. 4 is a diagrammatic illustration of a further step in making the liquid crystal structure for the optical filter of FIG. 1.
Figure 5:
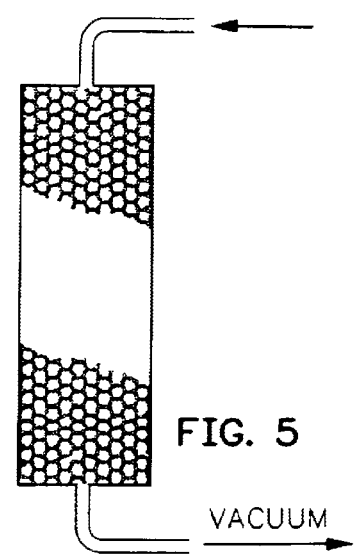
FIG. 5 is a diagrammatic illustration of a final step in making the liquid crystal structure for the optical filter of FIG. 1.

Referring to FIGS. 3–5 of the drawing, certain steps for fabricating the liquid crystal components of the present invention are illustrated. Referring first to FIG. 3, plastic (for example, polymer) balls 46 are selected and mixed with particles 48 of titanium dioxide and placed between a pair of plates 50 and 52 formed such as by a container or other mold or the like. These particles are thoroughly mixed so that the particles of titanium dioxide fill the spaces between the spheres and the mixture confined between plates 50 and 52 to form the liquid crystal matrix. The plastic balls are burned off by the application of heat in the range to 500 degrees C. to eliminate the plastic balls (FIG. 4) and fuse the titanium dioxide particles together. This high temperature eliminates the plastic balls, leaving the titanium dioxide fused, forming a matrix of generally spherical cavities or voids as illustrated in FIG. 2.

The polymer balls are selected to have a diameter range of about 10 to 50 nanometers. Preferably, the balls are selected to have as close to the same size as possible, in order to provide the maximum percentage of the liquid crystal, but at least two different sizes of balls may be employed if desired. The tunability of the liquid crystal can be adjusted by controlling the size and ratio of sizes of the balls used in forming the matrix. The titanium dioxide particles are selected to have a particle size ranging from about 5 to 50 nanometers in size, and preferably as close to the same size as possible. This results in a structure that will have the desired size droplets. Once the structure as shown in FIG. 2 is established by burning off the plastic balls and fusing the metal oxide, a process as illustrated in FIG. 5 is carried out to load liquid crystal into the cavities in the matrix structure. The matrix structure is confined within an enclosure so that a vacuum can be applied to the matrix. Liquid crystal is introduced under vacuum into the container of the metal dioxide matrix to fill the holes and voids in the matrix. Once the voids are filled, the liquid crystal unit is completed and assembled in a filter structure as shown in FIG. 1.

While the invention has been illustrated and described by means of specific embodiments, it is to be understood that numerous changes and modifications may be made therein without departing from the intent and scope of the invention as defined in the appended claims.

What is claimed is:

1. A tunable Fabry-Perot tilter, comprising:
   a pair of opposed, at least partially reflective surfaces defining an optical cavity of said Fabry-perot filter; and
   a metal-oxide matrix having a multiplicity of holes therein in said cavity;
   a nano-dispersion of liquid crystals disposed in said holes in said metal-oxide matrix in said matrix cavity.

2. The filter according to claim 1, wherein said liquid crystals are disposed in an array of holes in said metal-oxide matrix.

3. The filter according to claim 1, wherein said liquid crystals are disposed in an array of holes in said metal-oxide matrix, the metal oxide being taken from the group consisting of $TiO_2$, $SiO_2$ and $ZiO_2$.

4. The filter according to claim 2, wherein said metal-oxide matrix is $TiO_2$.

5. The filter according to claim 1, wherein said liquid crystals are disposed in an irregular array of generally spherical holes in said metal-oxide matrix.

6. The filter according to claim 5, wherein said holes are on the order of about 10 to 50 nm in diameter.

7. The filter according to claim 5, wherein said holes make up at least fifty percent of the volume of said matrix.

8. The filter according to claim 5, wherein said holes make up no more than about sixty-eight percent of the volume of said matrix.

9. The filter according to claim 5, wherein said holes make up from about fifty percent to about sixty-eighty percent of the volume of said matrix.

10. The filter according to claim 1, wherein said liquid crystals are in droplet form, said droplets being smaller than the optical wavelengths to be passed through the filter.

11. The filter according to claim 1, and further comprising means for applying an electric field to said liquid crystals.

12. The filter according to claim 11, wherein the optical wavelengths which the filter passes are tunable by varying the electric field applied across said optical cavity.

13. A tunable Fabry-Perot filter, comprising:
    a pair of opposed, at least partially reflective, generally parallel surfaces defining a cavity of said Fabry-Perot filter; and
    a nano-dispersion of liquid crystals disposed in an array in a metal-oxide matrix in said cavity.

14. The filter according to claim 13, wherein said liquid crystals are disposed in an array of substantially spherical holes in said metal-oxide matrix.

15. The filter according to claim 13, wherein said holes are on the order of about 10 to 50 nm in diameter and make up from about fifty percent to about sixty-eighty percent of the volume of said matrix.

16. The filter according to claim 14, wherein said metal-oxide matrix is formed of metal oxides taken from the group consisting of $TiO_2$, $SiO_2$ and $ZiO_2$.

17. The filter according to claim 13, wherein said liquid crystals are in droplet form, said droplets being smaller than the optical wavelengths to be passed through the filter.

18. The filter according to claim 14, and further comprising means for applying an electric field to said liquid crystals.

19. The filter according to claim 18, wherein the optical wavelengths which the filter passes are tunable by varying the electric field applied across said cavity containing said liquid crystals.

20. The filter according to claim 1, wherein said liquid crystals comprise 50–68% of the total volume of said metal-oxide matrix in said cavity.

21. A tunable Fabry-Perot filter comprising:
    a pair of opposed, at least partially reflective, generally parallel surfaces defining a cavity therebetween;
    a metal-oxide matrix having an array of a multiplicity of holes therein in said cavity, said metal-oxide matrix being formed by placing in a mold a mixture of polymer balls and metal-oxide particles, heating the mold to drive off the polymer and fuse the metal-oxide into said matrix defining an array of generally spherical voids; and
    a nano-dispersion of liquid crystal material disposed in said array of voids in said metal-oxide matrix in said cavity.

* * * * *